United States Patent [19]

Lauw

[11] Patent Number: 4,982,147
[45] Date of Patent: Jan. 1, 1991

[54] POWER FACTOR MOTOR CONTROL SYSTEM

[75] Inventor: Hian K. Lauw, Corvallis, Oreg.

[73] Assignee: State of Oregon acting by and through the State Board of Higher Education on behalf of Oregon State University, Eugene, Oreg.

[21] Appl. No.: 304,045

[22] Filed: Jan. 30, 1989

[51] Int. Cl.$^5$ ............................................. H02P 5/28
[52] U.S. Cl. ..................................... 318/729; 318/721; 318/722; 318/800; 318/808; 318/809; 388/812; 388/903
[58] Field of Search ..................... 318/729, 798–802, 318/805, 806–809, 720, 721, 722, 723; 332/32; 363/159–161; 388/811–815, 903, 908

[56] References Cited

U.S. PATENT DOCUMENTS

| | | | |
|---|---|---|---|
| 3,975,646 | 10/1976 | Kilgore et al. | 322/32 |
| 4,001,666 | 1/1977 | Grenfell | 318/731 |
| 4,039,909 | 10/1977 | Baker | 318/732 |
| 4,096,557 | 6/1978 | Schwarz | 363/180 |
| 4,132,931 | 1/1979 | Okuyama et al. | 318/809 |
| 4,227,136 | 10/1980 | Roesel, Jr. | 318/729 |
| 4,277,735 | 7/1981 | Okuyama et al. | 318/802 |
| 4,672,298 | 6/1986 | Rohatyn | 323/256 |
| 4,701,691 | 10/1987 | Nickoladze | 322/32 |
| 4,710,692 | 12/1987 | Libert et al. | 318/778 |
| 4,723,104 | 2/1988 | Rohatyn | 318/729 |

OTHER PUBLICATIONS

Ohi, M. and Kassakian, J. G.; "Dynamic Characteristics and Speed Feedback Stabilization of the Doubly-Fed Machine"; IEEE A76, 413–5, 1976.
Lauw, H. K.; "Characteristics of the Doubly-Fed Machine in a Hydro Variable-Speed Generation System"; BPA Contract No. 79-85BP24332, Jun. 1986.
Power Technologies, Inc.; "Variable Rotor Speed for Wind Turbines: Objectives and Issues"; EPRI AP-4261, Sep. 1985.
H. K. Lauw, "Variable-Speed Generation with the Series-Resonant Converter," Final Report, USDOE Bonneville Power Administration Contract No. 79-85BP24332 Mod-1, Jan. 1987.

Primary Examiner—William M. Shoop, Jr.
Assistant Examiner—David Martin
Attorney, Agent, or Firm—Klarquist, Sparkman, Campbell, Leigh & Whinston

[57] ABSTRACT

A device and associated method to control the electromechanical energy conversion process of a variable speed drive utilizing a doubly fed machine, which provides the mechanical energy as demanded by some mechanical load. Alternatively, a device and associated method is provided for a synchronous motor. The terminals of either the stator or rotor winding of the doubly fed machine are directly connected to a polyphase AC power grid of a certain grid frequency. The device establishes through electronic control a stable operation of the drive at a desired power factor at the terminals of these windings, irrespective of varying load conditions. This capability is provided without the need for computing or sensing this desired power factor and the subsequent feedback of its deviation from the desired value through a properly designed regulator. All signal processing as required can be conveniently and reliably implemented; only the easily accessible quantities of the stator voltage and real power supplied to the motor are sensed and subjected to simple algebraic manipulations. Torque speed characteristics produced by the drive are compatible with any demanded load condition within design limits. These flexibilities are retained along with the capability of electronically adjusting the drive speed without the need for detecting the mechanical load condition.

44 Claims, 6 Drawing Sheets

STATOR - SIDE

ROTOR - SIDE

POWER FACTOR MOTOR CONTROL SYSTEM

BACKGROUND OF THE INVENTION

This invention relates to AC variable speed drives and to methods of controlling variable speed drives and, more particularly, to a drive system which utilizes synchronous or doubly fed electric motors. The drive system is fed with polyphase AC (alternating current) electric power from a grid and is capable of driving a varying mechanical load while operating substantially at a desired power factor as seen from the power grid, such as unity power factor.

A doubly fed motor is an electrical machine having a rotor with rotor windings and a stator with stator windings. The doubly fed motor receives electrical power on both the stator and rotor windings. The received power may be polyphase AC power on both the stator and rotor windings. In the synchronous motor, polyphase AC power may be received by one set of either the stator or rotor windings, and direct current (DC) power to the other set of windings. The doubly fed motor is capable of variable speed operation, whereas the synchronous motor drives a load at synchronous speed.

Unity power factor is achieved when the waveforms of the polyphase AC voltage and current received from the power grid are in phase, that is, neither waveform is leading or lagging the other waveform. Operation at a poor power factor, either leading or lagging, draws more current from the line than strictly needed by the mechanical load driven by the motor. Operation at a poor power factor also creates unnecessary losses in the power lines supplying the motor as well as in the motor itself. Moreover, the motor has to be designed with a rating higher than required by the mechanical load at the full-load condition. Thus, the initial cost of such a motor, as well as the associated operating costs, are higher if the variable speed drive operates at a non-unity power factor, and unity power factor is a preferred embodiment in most situations. However, some applications may require the motor to be controlled at a desired power factor other than unity.

Previous variable speed drives have used a regulator which requires an error signal of a speed sensor output and a certain desired reference with variable speed drives, special signal. With other types of motors used arrangements are provided for frequency control of the armature voltage to attain a region of constant allowable torque. Often an additional controllable exciter or an additional power electronic converter is required to compensate for the detrimental effect of the armature reaction, as is required with other synchronous motor drives.

Several critical problems exist in prior variable speed drives using doubly fed motors. One problem, common to all types of AC variable speed drives, is the power electronic converter required to satisfy the adjustable frequency requirements of the motor currents. Most converters generate an excessive content of low-order harmonics in the voltage and current waveforms. Such a converter also produces a poor power factor as seen from the polyphase AC power grid to which the input side of the converter is connected.

However, recent progress in power electronic conversion technology has provided converters which constrain the detrimental low-order harmonics and the poor power factor. For example, the Schwarz converter as described in U.S. Pat. No. 4,096,557 is an effective means for establishing a near unity power factor as seen from the AC power grid.

A known configuration for interfacing the doubly fed motor drive with the AC power grid is to place any type of converter between the power grid and the motor. Both the stator and rotor windings of the motor are connected in opposite phase-polarity to the output terminals of the converter. Thus, the converter must be designed to provide the active, as well as reactive, power requirements of both stator and rotor windings for the entire speed range of the drive. This type of converter design suffers from increased initial and operating costs. Also, this known system suffers from inherent instability problems.

A rotor position feedback has been proposed to solve the inherent instability problem. Rotor position feedback leads to torque-speed characteristics similar to series DC motors. But this approach disadvantageously requires controlling the voltage with frequency to maintain a level of air gap flux adequate to produce maximum torque as required by the load.

The rotor position feedback approach also causes the loss of another attractive potential of the doubly fed motor, which is the speed adjustment flexibility. With rotor position feedback, the control system is constantly correcting for the speed error deviation from a desired reference speed. The time delays associated with this continual correction detract from the responsiveness of the drive system.

Therefore, a need exists for a new drive system, controller, and method for controlling motors at a desired power factor under varying mechanical loads.

SUMMARY OF THE INVENTION

Thus, it is an overall objective of the present invention to provide an AC variable speed drive having improved operational characteristics and particularly to provide a drive which utilizes a doubly fed motor.

It is an additional object of the present invention to provide a method for controlling a motor which maintains a desired power factor operation irrespective of varying mechanical loads.

Another object of the present invention is to provide a variable speed control method for controlling a variable speed drive comprised of an energy converter supplying a doubly fed motor which maintains a desired power factor operation under varying mechanical loads.

Still another object of the present invention is to provide a variable speed drive controller for controlling a variable speed drive that is responsive to changing mechanical loads and economical to operate.

Still another object of the present invention is to provide a unity power factor synthesizer for use in a variable speed drive controller for a doubly fed motor drive.

Another object of the present invention is to provide a desired power factor synthesizer for use in a drive controller for a synchronous motor drive.

An additional object of the present invention is to provide a drive controller which controls an energy converter of a drive operating in a controllable current source mode, and to provide a drive controller which controls an energy converter operating in a controllable voltage source mode.

A further object of this invention is to secure unity power factor operation without the need for computing or sensing the ambient value of this power factor and without the subsequent feedback of its deviation from unity through a properly designed regulator.

An additional object of this invention is to retain any desirable rotor speed as well as a favorable power factor operation without the need to detect the condition of the mechanical load.

Still a further object of this invention to secure stable operation irrespective of changes to the mechanical load condition.

An additional object of the present invention is to avoid torque angle values which could lead to a loss of synchronous operation.

Yet another object of this invention is to provide the variable speed drive with torque speed characteristics which are compatible with any load condition and changes to this condition within design limits.

A further object of the present invention is to provide a variable speed drive controller capable of calibration to account for the affects of aging on a doubly fed motor drive.

To achieve these objects, a method for controlling a doubly fed motor so as to control the power factor of the doubly fed motor under varying mechanical loads comprises the following steps. These steps are preferably carried out substantially simultaneously. In a monitoring step, the values of an electric power grid input to the doubly fed motor are monitored. In a setting step, a reference angular rotor speed is set. In a synthesizing or processing step, the monitored values of the electric power grid input and the set reference angular rotor speed are synthesized to produce a polyphase controller signal. In a converting step, a polyphase doubly fed motor input signal is produced by converting the input power from the electric power grid according to the polyphase controller signal. Thusly controlled, the doubly fed motor substantially maintains a desired power factor operation under varying mechanical loads. Additional methods are also provided for controlling a synchronous motor and for controlling an AC drive having a motor and an energy converter.

In an illustrated embodiment, the synthesizing or processing step of the method for controlling a doubly fed motor comprises the further steps of establishing a frequency signal, stabilizing the damping, and generating the controller signal. The monitoring step comprises monitoring the electric power grid voltage and active power input values. The synthesizing step includes using a precalibrated constant derived from the doubly fed motor physical geometry and winding parameters to produce the maximum rotor current amplitude signal. In a calibrating step, the precalibrated constant is intermittently calibrated to account for aging and hysteresis effects on the doubly fed motor. Also illustrated are the additional steps of limiting the power angle to values less than ninety degrees and of avoiding sudden stepwise changes of the reference angular rotor speed by an operator. Both of these last mentioned steps aid in maintaining a stable steady state operation of the doubly fed motor.

According to another aspect of the present invention, a variable speed drive controller is provided for controlling a variable speed drive having an energy converter supplying a doubly fed motor. The controller includes means for synthesizing the input values of the electric power grid to the doubly fed motor with a precalibrated constant. This synthesizing means produces a maximum amplitude signal corresponding to a desired power factor operation of the doubly fed motor. Means are also provided for establishing a frequency signal from a reference angular rotor speed and the electric power grid system frequency. Also included are means for generating a polyphase controller output signal from the maximum amplitude signal and the established frequency signal. The polyphase controller output signal is supplied to the energy converter of the variable speed drive. A doubly fed motor supplied by the energy converter controlled in this manner can operate at substantially a desired power factor under varying mechanical loads. Also provided is a modified controller for controlling a synchronous motor drive.

Additional drive systems are also provided. One variable speed drive system incorporates the variable speed drive controller discussed above with a doubly fed motor. Another drive system uses a modified controller with a synchronous motor. Each system also includes energy conversion means responsive to the drive controller. Unity power factor synthesizers are illustrated to provide unity power factor as the desired power factor in the various drive controllers.

Thus, the utilization of the doubly fed motor for variable speed drives offers many attractive features and advantages. The rotor speed can be adjusted without the need to include a properly designed regulator which requires the inputs of an error signal of a speed sensor output and a certain desired reference signal. As opposed to other types of motors used with variable speed drives, a doubly fed motor needs no special arrangements to control the armature voltage with frequency to attain a region of constant allowable torque. The size of this region is from standstill up to twice the base speed of a corresponding synchronous or induction motor. The doubly fed motor does not require an additional controllable exciter nor an additional power electronic converter to compensate for the effect of the armature reaction, as is the case with other synchronous motor drives.

In the configuration of the doubly fed motor drive of the present invention, just one side of the motor is connected to the output terminals of the converter. This side may be the terminals of either stator or rotor windings. The preferred embodiment has the terminals of the rotor windings connected to the converter, with the stator windings directly connected to the power grid. This configuration reduces the task of the converter compared to other configurations because only the reactive power requirements of the rotor windings need to be compensated. These reactive power requirements are insignificant in the speed region around the synchronous speed.

With this configuration it is possible to design and implement a control system that secures unity power factor at the stator winding terminals. This feature is important because, at rotor speeds close to the base speed, the electric power demanded by the load will be transferred through these stator windings. The control system can provide this unity power factor feature irrespective of varying load conditions.

Moreover, the control system is effective in containing possible stability problems associated with these load changes as well as with the changes which are activated for maintaining an operating condition with unity power factor. Stability problems are contained by avoiding torque angles which lead to a loss of synchronization. These unstable torque angles are avoided when unity power factor is maintained at all loading conditions.

These and other objects, features and advantages of the invention will become apparent to those skilled in the art from the following description and drawings.

DESCRIPTION OF THE PREFERRED EMBODIMENT

In this description of the preferred embodiment, the following characters i, v, I, V, P, Q, δ, f, ω are defined as: i=instantaneous current, v=instantaneous voltage, I=root mean square (rms) current, V=rms voltage, P=active power, Q=reactive power, δ=power angle, f=frequency, and ω=angular frequency or speed. A bar placed above "I" or "V" indicates phasor notation. The positive convention of these quantities is indicated in the drawings with arrows. The quantities which are measured by sensors for signal processing inputs, as well as the controller output signals, have a subscript asterisk. The subscript "f" denotes feedback, while subscripts "a", "b" and "c" designate the alternating current phases of a three phase system. Superscript "s" and "r" denote stator and rotor quantities respectively. Subscript "d" denotes damping, "m" denotes motor, and "s" denotes the power grid system.

Figure 1:
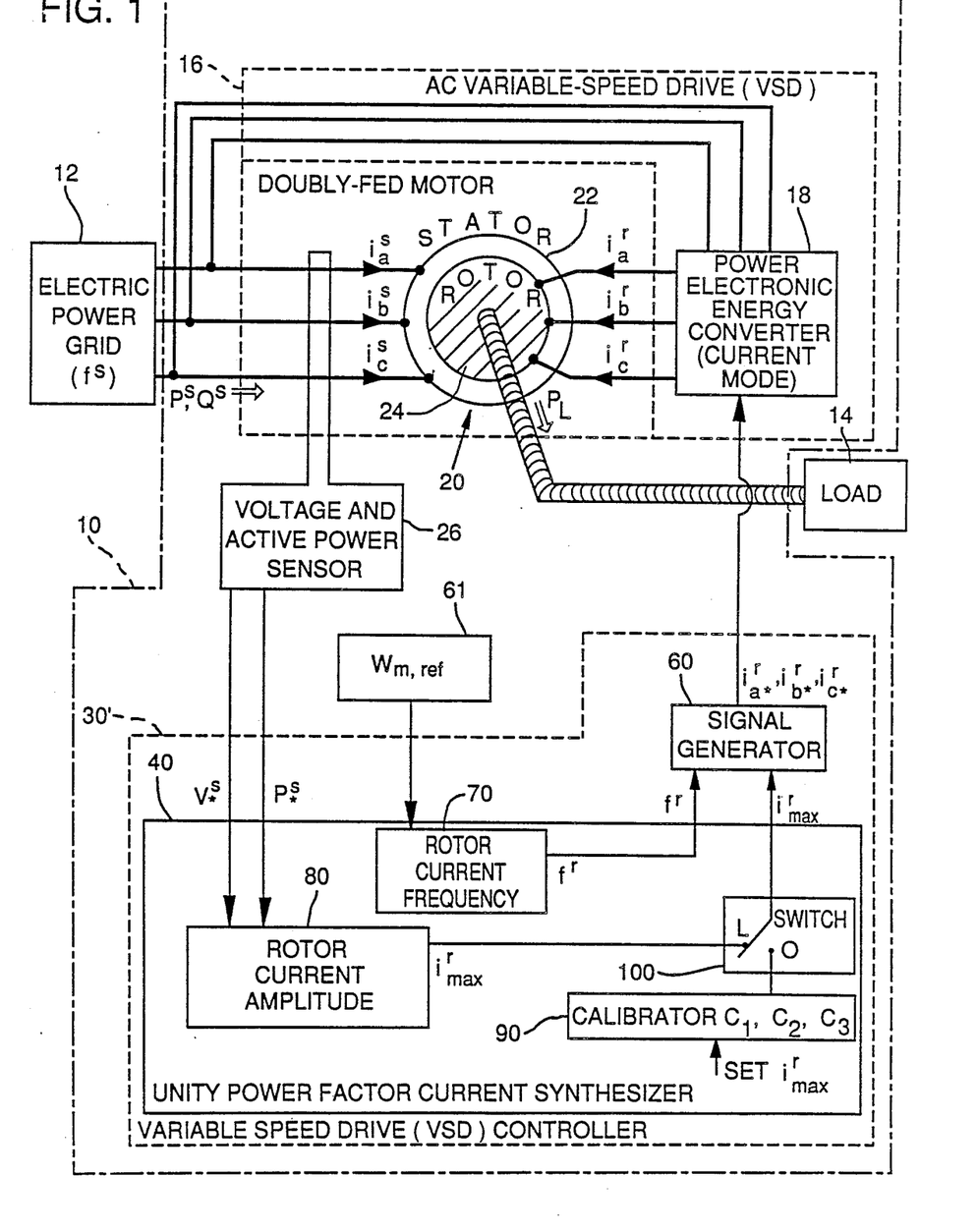
FIG. 1 is a schematic block diagram of one form of the present invention with an AC variable speed drive (VSD) utilizing a doubly fed motor and an energy converter operating in a current mode which is controlled by a VSD controller.
Figure 2:
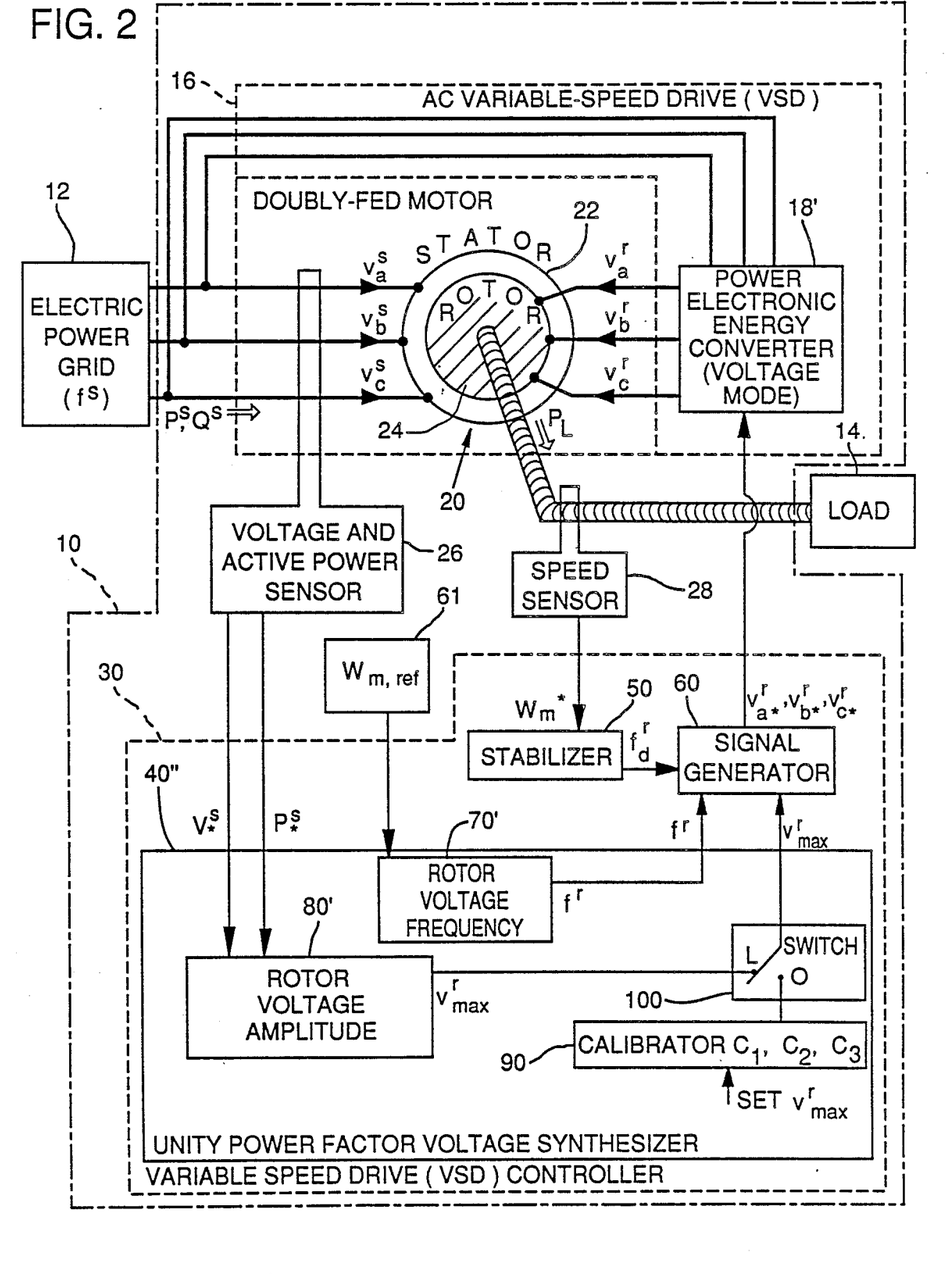
FIG. 2 is a schematic block diagram of another form of the present invention, using an energy converter operating in a voltage mode.

Referring to the illustrated embodiment for providing a desired power factor of unity, shown in FIGS. 1 and 2, an alternating current (AC) variable speed drive (VSD) system 10 receives AC power from an electrical power system or grid 12 having a system frequency $f_s$. The VSD system 10 supplies rotating mechanical power to drive a mechanical load 14, such as a pump.

The VSD system 10 includes an AC variable speed drive (VSD) 16 having energy conversion means, such as a power electronic energy converter 18, for converting electrical power from the grid 12 into excitation current. FIG. 1 shows the VSD system 10 for a power electronic energy converter 18 operating in a controllable current source mode, whereas the VSD system 10 of FIG. 2, illustrates a converter 18' operating in a controllable voltage source mode. In the voltage mode, voltage amplitudes and frequencies are considered whereas current amplitudes and frequencies are considered in the current mode.

Figure 3:
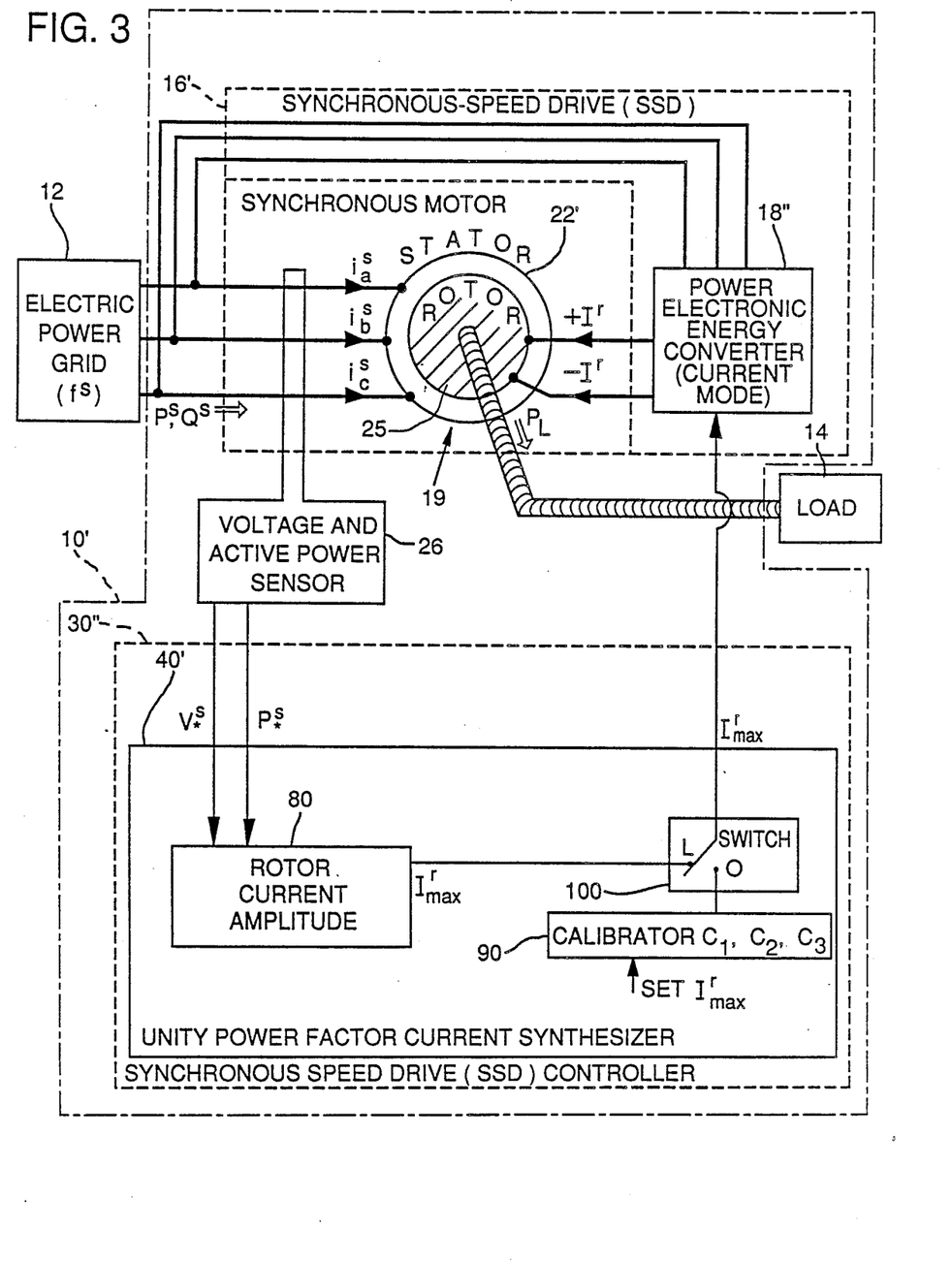
FIG. 3 is a schematic block diagram of another form of the present invention with a synchronous speed drive (SSD) utilizing a synchronous motor and controlled by an SSD controller.

FIG. 3 is an illustrated embodiment for providing a desired power factor of unity, shown as a synchronous speed drive system (SSD) system 10' which receives AC power from the power grid 12 and drives the load 14. The SSD system 10' includes a synchronous speed drive (SSD) 16' having energy conversion means, such as a power electronic energy converter 18'', for converting electrical power from the grid 12 into DC (direct current) excitation current.

While unity power factor is illustrated as a preferred embodiment, applications of this invention include control of the power factor at desired values other than unity. For example, a leading power factor may be desired in an industrial factory setting where other motors are demanding reactive power so as to correct the overall power factor at the industrial factory.

The principles of this invention apply to the use of any type of energy conversion means or converter, such as a rotating exciter. However, a power electronic converter 18 is illustrated for its high response speed and flexibility. A variety of power electronic converters are commercially available, having the basic configuration of FIG. 4.

Figure 4:
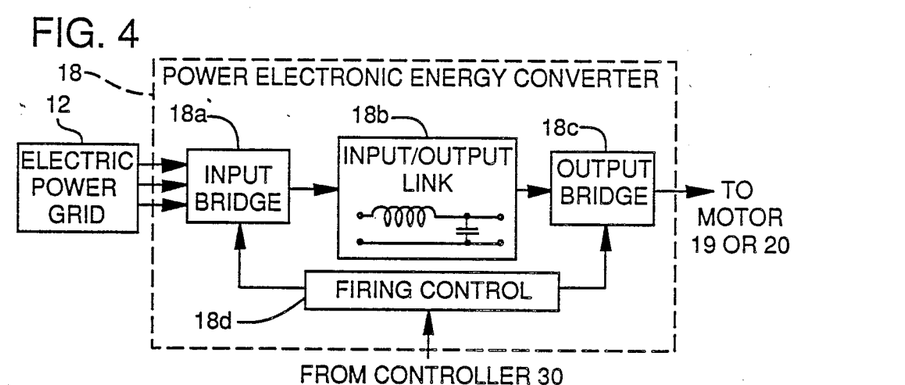
FIG. 4 is a schematic block diagram of one form of a power electronic energy converter of the present invention.

The converter 18 comprises an input bridge 18a, receiving power from grid 12 and conditioning the power for input to an input/output link 18b. The input/output link 18b is often a DC filter comprising a series conductor and a parallel capacitor as shown in FIG. 4. The filtered output of link 18b is supplied to an output bridge 18c which further conditions the power for use by a motor, described below. The input and output bridges 18, 18c are comprised of semiconductors, such as MOSFET's, silicone controlled rectifiers (SCR's), and diodes. Although the configurations of the semiconductors in the input and output bridges vary by manufacturer, the input bridge 18a is typically a full or half wave rectifier, whereas the output bridge 18c is typically an inverter bridge. Transformers may also be included in the converter 18 to step-up or to step-down the voltage as required by the particular application.

The converter 18 also includes a firing control circuit 18d which controls when the semiconductors of the input and output bridges 18a, 18c trigger to conduct current. The firing control circuit 18d is responsive to a controller signal which is discussed in greater detail below. The converter may also be designed to accept an input of DC power, such as from a battery. Also, the output of a converter may be either polyphase AC or DC power, as required by the particular application. Another example of a suitable converter is described in U.S. Pat. No. 4,096,557 to Schwarz.

The converter 18 supplies the excitation current to an electrical machine operated as a motor, such as a synchronous motor 19 or a doubly fed motor 20, in response to a controller signal which is discussed in greater detail below. The doubly fed motor 20 has a stator with stator windings, indicated by the outer circle 22, and a rotor with rotor windings, indicated by the inner circle 24 in FIGS. 1 and 2. For the synchronous motor 19 of FIG. 3, the stator windings 22' generally are the three-phase AC armature or power windings directly connected to the grid 12. The synchronous rotor windings 25 are generally the DC (direct current) field or excitation windings, although the stator could carry the field and the rotor carry the armature.

For a conventional doubly fed motor 20, both the stator windings 22 and rotor windings 24 carry three-phase power, similar to an induction motor. However, the rotor of an induction motor is not physically connected to an external excitation source. The rotor of a conventional doubly fed motor is connected to an external polyphase AC excitation source by, for example, a commutator. Thus, a conventional doubly fed motor may be considered a hybrid between the synchronous and induction motors.

Either the stator or rotor windings of the doubly fed motor 20 could be the excitation windings. However, since the excitation current is always of a lesser magnitude than the power current, the rotor windings are preferably the excitation windings This allows the converter 18, rotor 24, brushes and slip rings transferring the converter output to the rotor 24 to be smaller and more economically produced and used. Alternatively, if the rotor 24 is connected to the power grid 12 and the stator windings 22 to the converter, the rotor conductors and slip rings must handle the greater amount of transferred power. This and the associated greater power loss ($I^2R$ losses) through the converter are a significant disadvantage of the stator to converter connection.

Hence, the preferred embodiment connection is shown in FIGS. 1–3 with the converter 18 connected to the doubly fed rotor 24 or to the synchronous rotor 25, and the power grid 12 to stator 22. The stator 22 carries the power windings connected to grid 12 and the rotor windings 24 or 25 are connected to the output terminals of the energy converter 18.

With this configuration, the converter 18 maintains unity power factor operation of the motor 19, 20 as seen by the power grid 12. Specifically for the doubly fed motor 20, in the undersynchronous mode of operation, the converter extracts active power from the rotor windings. In the synchronous and oversynchronous modes of operation, the converter 18 supplies active power to the doubly fed rotor windings 24. For the synchronous motor 19, the converter 18 supplies DC current to the DC rotor 25 at levels sufficient to maintain synchronism of the motor. The synchronous motor 19, which operates at a synchronous speed, responds to the varying torque requirements of load 14 by drawing additional power from the grid 12 at unity power factor.

The drive system 10 of FIGS. 1–3 has a voltage and active power sensor 26 which detects the voltage and active power being supplied by the power grid 12 to the stator 22. The power grid voltage is denoted as $V^s$ and the active power as $P^s$. The sensor 26 includes conventional transducers, such as Hall effect type current transducers and voltmeters, to monitor the voltage and active power.

The VSD system 10 of FIG. 2 with the converter 18' operating in the controllable voltage source mode also includes a speed sensor 28 which detects the actual speed $\omega_m$ of motor 20 driving load 14. The speed sensor 28 includes a transducer, which may be, for example magnetic or optic, to monitor the rotor speed in terms of angular velocity. The speed sensor output is used to determine the required frequency damping as described further below. The converter 18 of FIG. 1, operating in the controllable current source mode has been found not to require the feedback of speed sensor 28. Since the synchronous motor 19 of FIG. 3 only requires DC excitation, frequency damping is irrelevant and the speed sensor 28 is not required.

Referring to FIG. 2, a variable speed drive (VSD) controller 30 receives and processes or conditions sensor signals $\omega_m$ from speed sensor 28, and $V^s$ and $P^s$ from sensor 26 to produce a controller signal output for input to converter 18', as described in greater detail below. The polyphase controller signal outputs are illustrated as balanced three phase voltage signals $v_a^r$, $v_b^r$ and $v_c^r$, which the converter 18' receives as input to the firing control circuit 18d (see FIG. 4). Converter 18' supplies the rotor 24 with power in terms of the three voltage, $v_a^r$, $v_b^r$ and $v_c^r$.

In the illustrated embodiment of FIG. 1, the converter 18 is operated in the controllable current source mode. The VSD controller 30' signal output comprises polyphase reference current controller signals, illustrated as three phase signals $i_a^r$, $i_b^r$ and $i_c^r$ which are supplied to the converter 18 firing control 18d (see FIG. 4). These reference signals are used by converter 18 to set the converter three-phase output currents $i_a^r$, $i_b^r$ and $i_c^r$ for input to the rotor 24 of the doubly fed motor 20.

In the illustrated embodiment of FIG. 3, since the synchronous motor 19 only requires DC excitation, the SSD controler 30" output signal is merely the maximum amplitude or value of the DC current, $I^r$. As with the VSD system of FIG. 2, the SSD controller 30" output signal could also be expressed in terms of maximum voltage. The converter 18" firing control 18d receives the $I^r$ signal and fires to supply the proper level of input current $I^r$ to the synchronous rotor 25.

The VSD system 10 for unity power factor operation of the drive is not restricted to the AC variable speed drive configuration 16 of FIGS. 1 or 2. For example, the motor 20 may be wound as a two-phase motor rather than three-phase. Regarding FIGS. 1–3, transformers to step up or step down the voltages at various locations may also be included when necessary for properly interfacing the converter, motor and power grid.

The VSD controller 30 of FIG. 2 includes three interconnected functional blocks: (1) a unity power factor synthesizer, illustrated as a voltage synthesizer or processor 40", (2) a stabilizer 50, and (3) a signal generator 60. Since the design of the stabilizer 50 and the signal generator 60 are known to those skilled in the art they will only be described briefly here. The description of this invention will focus on the effectiveness and design of an illustrated embodiment of the unity power factor current synthesizer 40. FIG. 3 shows an alternate embodiment of a synthesizer 40' of FIG. 1 used with the synchronous motor 19. First, a brief overview will be given of the interconnection and control signals of the synthesizer 40", stabilizer 50 and signal generator 60.

Basically, the synthesizer synthesizes or processes the required waveform of the rotor 24 or 25 winding current or voltage for controlling the power factor of the motor and to secure stable operation at any desirable drive speed of load 14. The VSD system 10 includes setting means 61 for adjusting and setting a reference rotor speed $\omega_{m, REF}$, which may be adjusted manually by an operator or by automated means (not shown). In the manner described below with reference to FIG. 1, the inputs of a reference rotor speed $\omega_{m,\,REF}$, the stator voltage $V^s$ and active power $P^s$ from sensor 26 are processed to produce synthesizer 40 output signals $f^r$ for the frequency and $i^r$ for the amplitude of the rotor current waveform. Synthesizer 40' output for the synchronous motor 19 is $I^r$. In both the and synchronous cases, this is accomplished to maintain unity power factor, as seen by the electric power grid 12 at the terminals of the stator windings 22 or 22' of the respective motor 19 or 20.

Figure 5A:
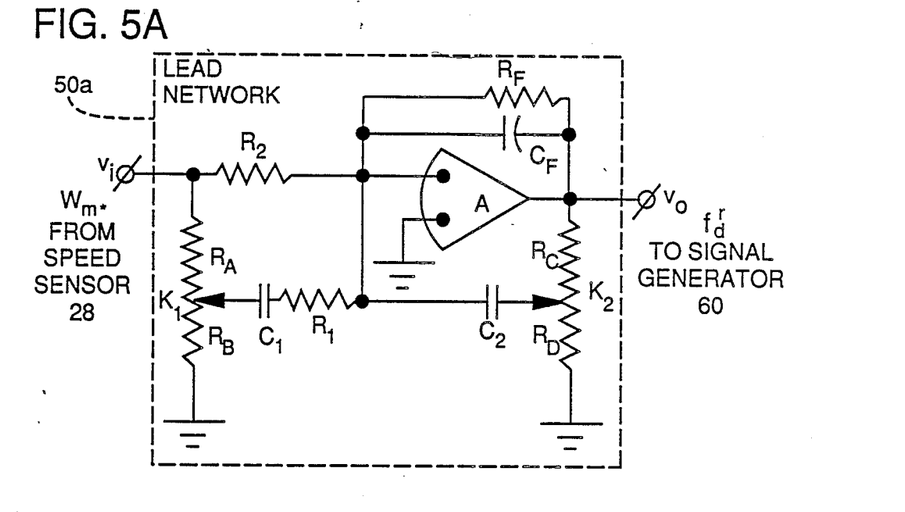
FIG. 5A is a schematic diagram of one form of a lead network suitable for use in a stabilizer of the present invention.
Figure 5B:
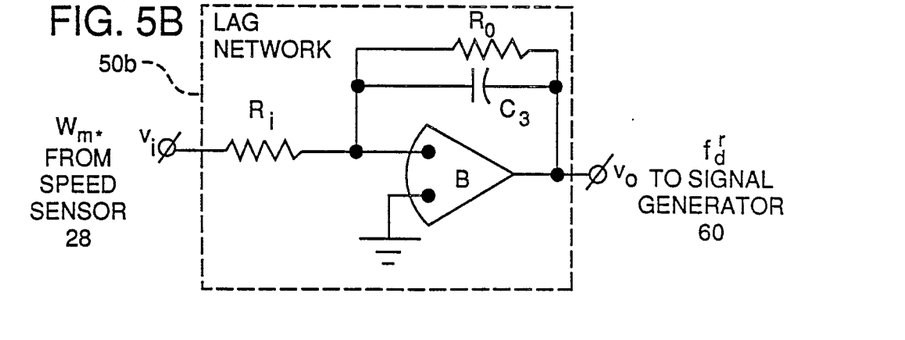
FIG. 5B is a schematic diagram of one form of a lag network, also suitable for use in a stabilizer of the present invention.

The function of the stabilizer 50 is well-known to those skilled in the art. Such stabilizers are comprised of lead and lag networks, connected in series combinations, or parallel combinations or both. An example of such a lead network 50a is shown in FIG. 5A, and a lag network 50b is shown in FIG. 5B. The speed sensor 28 detects the rotor speed and provides an input to the stabilizer 50 of the actual angular rotor speed $\omega_m$. The stabilizer 50 produces a stabilizing damping frequency signal output $f^r$. Damping is required to prevent oscillatory behavior of the rotor shaft speed when the power electronic converter 18' is operated in the voltage mode. The stabilizer output signal $f^r$ provides proper damping to the doubly fed motor which produces negative damping effects due to the so-called induction torque. Adequate reference to this phenomenon can be found in the art. For example, see the paper by M. Ohi and J. C. Kaskian: "Dynamic Characteristics and Speed Feedback Stabilization of the Doubly-Fed Machine," IEEE Paper A76 413-5, Power Engineering Society, Portland, Oreg., 1976.

In the illustrated embodiment of the lead and lag networks, 50a and 50b in FIGS. 5A and 5B, with R's designating resistors, C's designating capacitors, and A, B as operational amplifiers, the lead network 50a maintains the ratio of the output to input voltage $v_o$ to $v_i$ as:

$$\frac{v_o}{v_i} = \frac{1 + a\,ts}{1 + ts}$$

with: "s" denoting the Laplace transform;
Adjustable gain:

$$a = \frac{K_1 C_1}{K_2 C_2} > 1$$

Adjustable Time Constants: $t = K_2 R_F C_2$
Potentiometers:

$$K_1 = \frac{R_B}{R_A + R_B},\ K_2 = \frac{R_D}{R_C + R_D}$$

The circuit components should be adjusted so that:

$$t_1 < t_2 \text{ and } t_F < t$$

with:

$$t_1 = R_1 C_1,$$
$$t_2 = K_1 R_F C_1,$$
$$t_F = R_F C_F$$

The lag network 50b maintains the ratio of output to input voltage $v_o$ to $v_i$ as:

$$\frac{v_o}{v_i} = \frac{R_o}{R_i(1 + ts)}$$

with:

Time Constant: $t = R_o C_3$

Referring to FIG. 2, the signal generator 60 receives the stabilizer 50 output $f_d^r$ and the synthesizer 40" outputs $f^r$ and $i^r$. The damping stabilizing output signal $f^r$ of the stabilizer 50 is added to the synthesizer 40" output frequency signal $f^r$ by the signal generator 60, to stabilize the motor by effecting the frequency of the rotor voltage. To generate the three-phase doubly fed motor rotor winding voltage reference signals, $v^r$, $v^r$ and $v^r$, the signal generator 60 provides 120° positive and negative phase shifts to the combined frequency and the amplitude signals. An example of such a signal generator is commercially available from Tektronix, Inc., Tektronix Industrial Park, Beaverton, Oreg. 97077 under the name of TM500 series signal generator.

It is evident from the diagram of the VSD controllers 30 of FIGS. 1–3 that unity power factor operation, as well as a speed adjustment for the doubly fed motor, is accomplished without a feedback loop. No error signal feedback of the actual power factor deviation from unity is required. Nor is an error signal of the speed deviation from a desired reference speed $\omega_{m,\,REF}$ required. Hence, the costly regulator to which such error signals would be fed is advantageously eliminated.

The operation of synthesizer 40 will now be discussed in detail with reference to the embodiment of FIG. 1. The unity power factor current synthesizer 40 receives signals from sensor 26 of the stator winding terminal voltage $V^s$, the stator winding active power input $P^s$, and an adjustable reference speed $\omega_{m,\,REF}$. The output of the synthesizer 40 provides a target state for the amplitude $i^r$, and the frequency $f^r$ of the rotor winding currents; hence, the name "current synthesizer." For the synthesizer 40" of FIG. 2, voltage signals are produced, hence the alternate name of "voltage synthesizer" is appropriate. The synthesizer 40 comprises three noninteractive signal processing means shown as blocks: (1) a rotor current frequency ($f^r$) block 70, (2) a rotor current amplitude ($i^r$) block 80, and (3) a calibrator 90 for the calibration of constants ($c_1$, $c_2$, and $c_3$) required by the rotor current amplitude block 80. For the voltage synthesizer 40", the designation of the blocks changes to: (1) a rotor voltage frequency ($f^r$) block 70', (2) a rotor voltage amplitude ($V^r$) block 80'. The operation of the voltage synthesizer 40" is apparent from the following discussion of the operation of the current synthesizer 40.

Referring to FIG. 3, the current synthesizer 40' used in the synchronous speed drive controller 30" is a simplified form of that used with the doubly fed motor. Since the synchronous motor 19 only requires DC excitation, the rotor frequency block 70 is not required to produce the frequency component, such as $f^r$ for the controller output signal.

The rotor current amplitude block 80 has an output designated $I^r$, to indicate the DC nature of the current as eventually supplied to the synchronous motor 19. Otherwise, the function of the current synthesizer 40' for the synchronous speed drive is identical to that discussed below for the doubly fed motor current synthesizer 40.

The causal relationships justifying the effectiveness of the scheme for processing the three input signals ($V^s$, $P^s$, and $\omega_{m,\,REF}$) to the current synthesizer 40 will be below with reference to FIG. 1 and the detailed description of blocks 60, 70, and 80.

The rotor current frequency ($f^r$) block 70 adjusts the rotor speed $\omega_m$ of the drive motor 20 to any desired constant value as set by the reference signal $\omega_{m,\,REF}$. The operation of this block is based on the following relation, which is satisfied when the doubly fed motor 20 operates in a steady state and stable condition:

$f_s = f^r + (n_p \omega_m / 2\pi)$, that is:
$$f^r = +f_s - (n_p \omega_{m,\,REF}/ 2\pi) \tag{1}$$

with $\omega_m$ the angular rotor speed, $n_p$ the number of pole pairs, $f^r$ the current frequency of the rotor windings, and $f_s$ the system frequency of the electric power grid 12 supplying the stator 22 of FIG. 1.

The frequency $f_s$ could be monitored by the addition of a frequency sensor to the voltage and active power sensors 26. Since modern power systems essentially supply power at a constant frequency, $f_s$ may be set at the system frequency, e.g., 60 Hz in the United States and 50 Hz in Europe. In the illustrated embodiment $f_s$ is set at the system frequency.

Hence, the rotor current frequency ($f^r$) block 70 adjusts the frequency of the rotor windings so the actual angular rotor speed $\omega_m$ corresponds to the reference signal $\omega_{m,\,REF}$. Simple analog components can be used to implement the relation in the rotor current frequency block 70 without undue experimentation by those skilled in the art. Because only an algebraic relation is involved, microprocessors would also be quite adequate to implement this control function.

The doubly fed motor 20 is only capable of operating according to the relation of equation (1) in a stable operating condition. The stabilizer 50 of FIG. 2 guarantees stability in the sense that the doubly fed motor does not cause negative damping torques. However, stable operation also requires the power angle $\delta$ to be limited within a certain range for any loading condition. This stability requirement is met by execution of the instructions in the rotor current amplitude ($i^r$) block 80, discussed below.

Another less important stability requirement is the prevention of large sudden changes in the speed reference signal $\omega_{m,\,REF}$. The rotor speed $\omega_m$ can be gradually changed to any value within the doubly fed motor design limits without endangering stable operation. However, a stepwise change to the rotor speed reference signal $\omega_{m,\,REF}$ must be kept below a certain value. This limiting value varies with the parameters of the drive system, and it is of course within control of an operator to avoid sudden changes beyond this value. The limit to the stepwise change of the rotor speed reference signal $\omega_{m,\,REF}$ is on the order of one percent of the synchronous speed for practical doubly fed motors.

Referring to FIG. 1, the rotor current amplitude block 80 establishes the required amplitude $i^r$ of the currents in the windings of rotor 24. The input signals are the sensor 26 signals representing the rms terminal voltage $V^s$ and the active input power $P^s$ of the windings of stator 22. The system frequency is $f_s$.

$$I^r = c_1 \sqrt{c_2 (P^s/V^s)^2 + c_3 P^s + (V^s)^2} \,/ f_s \tag{2}$$

$$i^r_{mxa} = I^r / \sqrt{2}$$

where $c_1$, $c_2$ and $c_3$ are constants, which occasionally may be recalibrated as described below.

Figure 6:
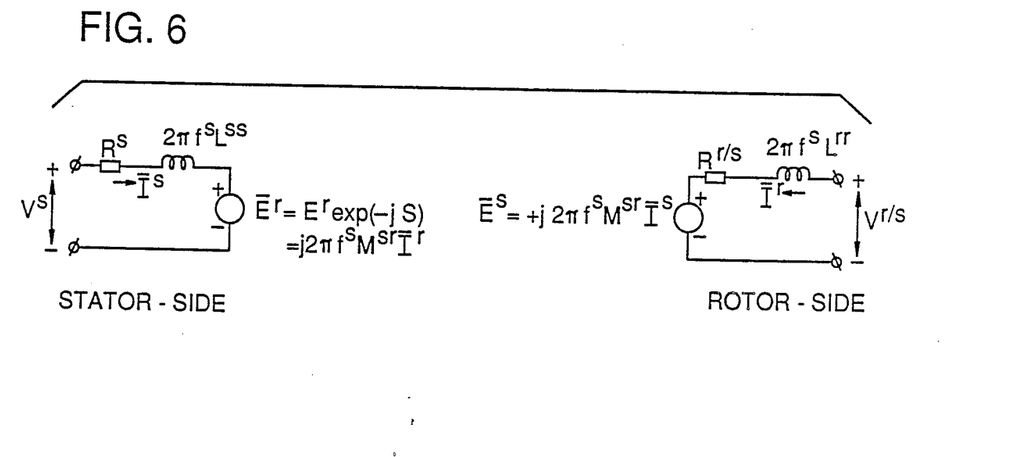
FIG. 6 is a typical single-phase equivalent diagram of a doubly fed machine.

The single phase equivalent diagram of the doubly fed motor 20 is shown in FIG. 6. The effectiveness of the rotor current amplitude block 80 is illustrated by the so-called "circle diagrams" of the doubly fed motor 20 (see FIGS. 7 and 8). These circle diagrams are easily constructed from the following relation which is obtained from the voltage equations of the equivalent diagram of the doubly fed motor, shown in FIG. 6:

$$I^s = \frac{V^s}{Z^s} \exp\left[j\left(\alpha^s - \frac{\pi}{2}\right)\right] + k\, I^r \exp\left[j\left(\alpha^s + \frac{\pi}{2} - \delta\right)\right] \tag{3}$$

with the motor constant k, the impedance $Z^s$, and the angle $\alpha^s$ defined as:

$$k = 2\pi f_s M^{sr}/Z^s \tag{4}$$

$$Z^s = \sqrt{(R^s)^2 + (2\pi f_s L^{ss})^2}$$

$$\alpha^s = \mathrm{Arcsin}(R^s/Z^s)$$

with $R^s$ the stator winding resistance, $L^{ss}$ the stator self-inductance, $M^{sr}$ the peak value of the stator to rotor mutual inductance, and $\delta$ the power (torque) angle. $I^s$ and $I^r$ are respectively the rms currents in the stator 22 windings and the rotor 24 windings. The bar above $I^s$ denotes phasor notation, and $V^s$ is taken to have zero phase angle.

Consider in addition the power balance relations:

$P^s = P_R^s + P_{ag}$ $$P^s = 3 V^s I^s \cos \phi \tag{5}$$

$Q^s = 3 V^s I^s \sin \phi$ with $P^s$ the power dissipated through the stator winding resistance $R^s$; $P^s$ and $Q^s$ the active and reactive input power respectively to the stator 22 windings; and $\phi$ the power factor angle.

The electromagnetic torque produced by the motor 20 is given by:

$$T_{em} = P_{ag} (n_p 2\pi f_s) \tag{6}$$

where $P_{ag}$ is the airgap power.

Figure 7:
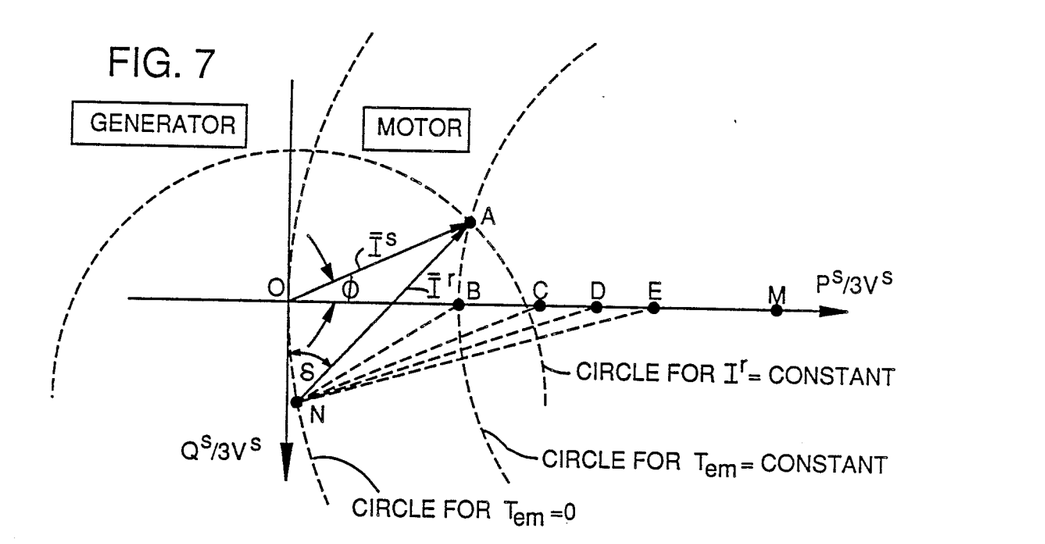
FIG. 7 is a typical circle diagram of a doubly fed machine which may be used to analyze the characteristics and the status of an operating point of the doubly fed machine.
Figure 8:
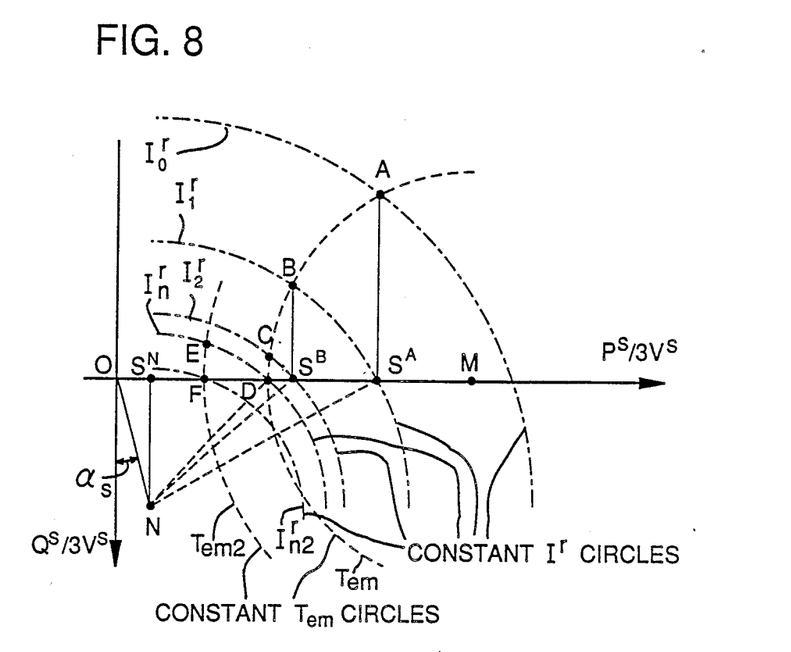
FIG. 8 is a circle diagram which illustrates the effectiveness of the unity power factor current-synthesizer under fixed and changing conditions of a driven mechanical load.

The relations given in the equations (3) through (6) are basically reflected in FIGS. 7 and 8, where angle $\alpha^s$ is the angle between line NO and the vertical axis. The $V^s$ phasor is on the positive horizontal axis with 0 as origin. Letter M is the center for circles of constant $T_{em}$, while N is the center for circles of constant $I^r$. The circle diagrams for constant electromagnetic torque $T_{em}$ and constant rms value of the rotor winding currents $I^r$ are shown for a constant electric power grid frequency $f_s$ and a given rms value of the stator winding terminal voltage $V^s$. The points M and N are respectively the centers of circles representing these constant values of torque $T_{em}$ and current $I^r$. The ordinates of these centers are given by:

$$M = \{V^s/2R^s, 0\}$$

$$N = \{(V^s \sin \alpha^s)/Z^s, -(V^s \cos \alpha^s)/Z^s\}$$

Practical motors have relatively low values for $R^s$ and hence also $\alpha^s$. As a result, M is located far to the right on the horizontal axis shown in FIG. 7, and N is practically located on the vertical axis. From these circle diagrams, the complete status regarding the operating modes of motor 20 can be determined.

A stable steady state operating mode of a doubly fed machine, acting as a generator or motor, is possible when a circle for a certain constant value of electromagnetic torque $T_{em}$ intersects a circle for a constant value of rotor winding current $I^r$. This point of intersection, called an operating point, completely defines the operating condition of the doubly fed machine 20.

For example, consider operating point A in FIG. 7, shown for a given stator voltage $V^s$ and electric power grid frequency $f_s$. The diagram provides the values of the following quantities which completely characterize the operating mode represented by operating point A: the stator winding current $I^s$, the rotor winding current $I^r$, the power factor angle $\phi$, the power (torque) angle $\delta$, the electromagnetic torque $T_{em}$, and the active and reactive power flow to the stator windings, $P^s$ and $Q^s$, respectively.

Moreover, a location of the operating point on the right-half plane of the diagram in FIG. 7 indicates that the doubly fed machine is operating as a motor, except for the small region between the vertical axis and the circle for $T_{em}=0$. In this small region the machine operates as a passive network. Operating points on the left-half plane of the diagram represent operation of the machine as a generator.

The steady state stability condition of motor operation requires that the power (torque) angle $\delta$ is less than 90°. This can be found by gradually increasing the electromagnetic torque $T_{em}$, while holding the rms value of the rotor winding current $I^r$ constant.

First assume that the initial operating mode corresponds with operating point A on the diagram in FIG. 7. Then increase the torque $T_{em}$, which decreases the radius of the $T_{em}$ circle. The operating point intersection between these two circles, initially A, will shift along the constant $I^r$ circle. Eventually, this results in a loss of the intersection between the constant $I^r$ circle and the constant $T_{em}$ circle. Since $\delta$ is the angle between the line NO and the line through N and the operating point, this loss of intersection occurs when the power angle exceeds 90°, and unstable operation follows.

Now consider the modes of operation of the motor at unity power factor or equivalently, the operating points for which the power factor angle $\phi$ is equal to zero. These modes of operation correspond with operating points in FIG. 7 along the positive part of the horizontal axis. Examples are the operating points B, C, D, and E. The power (torque) angle $\delta$ at these operating points is less than 90°; hence, these operating points can all be classified as stable. If the desired power factor is other than unity, the operating points such as B, C, D or E are positioned on a straight line through the origin at an angle corresponding to the power factor angle.

For operating points far to the right on the horizontal axis, the power angle $\delta$ approaches the critical value of 90°. However, the diagram in FIG. 7 shows that this occurs only for extremely high stator and rotor winding currents which are prohibited by practical machine design limitations. Therefore, steady state stable operation is secured as a by-product of successful unity power factor operation. The following explanations deal with the effectiveness of the preferred embodiment in this respect.

The circle diagrams of FIG. 7 are redrawn in FIG. 8 for a relatively larger stator resistance. This results in the center M for the circles of constant torque $T_{em}$ being located closer to the origin. The method and operation of the rotor current amplitude block 80 in establishing unity power factor will be explained utilizing FIG. 8.

For simplicity, assume that the load 14 is nonvarying, which implies that the rotor speed and torque as demanded by the load 14 are constant. The initial operating state corresponds to an operating point such as A in FIG. 8, which is the intersection of the constant $T_{em}$ circle and the initial constant rotor current circle, $I^r$. A constant torque condition requires that the operating points remain on the constant $T_{em}$ circle through point A. Consequently, the unity power factor current-synthesizer 40 establishes the value of the rms rotor winding current corresponding to the operating point which satisfies two conditions. First, the operating point lies on the constant $T_{em}$ circle; and second, the power factor angle $\phi$ is zero. In FIG. 8, this situation corresponds to point D, the intersection of the constant $T_{em}$ circle containing point A with the horizontal axis.

The illustrated embodiment of rotor current amplitude block 80 achieves this shift of the operating point from A to D to yield unity power factor operation under a nonvarying load as follows. First, from the inputs of the voltage $V^s$ and the active power $P^s$, the amount of the rms rotor winding current to provide a constant $I^r$ circle through point $S^A$ is determined. As shown in FIG. 8, point $S^A$ is the projection of point A onto the horizontal axis.

Since the horizontal axis of the circle diagram indicates the values of $P^s/3V^s$, the distance $OS^A$ along the line from the origin 0 to point $S^A$ is equal to $P^s/3V^s$ with $P^s$ and $V^s$ as measured at operating point A. The value of $I^r$ for the constant $I^r_1$ circle through point $S^A$ is found from the equation: $k\, I^r = NS^A$, with k a motor constant given by equation (4) and point N the center of the constant $I^r$ circles. Since $S^N$ is the projection of point N on the horizontal axis, it clearly follows that:

$$I^r = NS^A/k = \sqrt{(OS^A - OS^N)^2 + (NS^N)^2}\ /k; \tag{8}$$

where: $OS^A = P^s/3V^s$

The distances $OS^N$ and $NS^N$ are respectively the horizontal and vertical ordinates of point N, given in equation (7). The relations of equations (4) and (7) yield:

$$I^r = c_1 \sqrt{c_2\,(P^s/V^s)^2 + c_3\,P^s + (V^s)^s}\ /f_s \tag{9}$$

where: $c_1 = \tfrac{1}{2}\pi M^{sr}$, \tag{10}

$c_2 = (Z^s/3)^2$, $c_3 = -2R^s/3$ where: $c_1 = \tfrac{1}{2}\pi M^{sr}$, $c_2 = (Z^s/3)^2$, $c_3 = -2R^s/3$ Hence, the constants $c_1$, $c_2$, and $c_3$ depend upon the motor parameters of motor 20.

In equation (4), the impedance $Z^s$ is expressed in terms of the motor parameters. The calculation of $I^r$ with equation (9) establishes the rms rotor winding current $I^r$ corresponding to the constant $I_1^r$ circle through point $S^A$. Consequently, the implementation of equation (9) by the rotor current amplitude block 80 shifts the position of the operating point along the circle for a constant $T_{em}$, with the new value of $I^r$ obtained from equation (9). This operating mode corresponds to operating point B in FIG. 8, since B is the intersection of the constant $T_{em}$ circle through operating point A and the constant $I^r$ circle through point $S^A$.

The process of shifting the operating point from A to B has brought the power factor closer to unity. Continued subsequent execution or iteration of equation (9) by the rotor current amplitude block 80 results in yet another rms rotor winding current $I^r$. This new value corresponds to the constant $I^r$ circle through point $S^B$, which is the projection of operating point B on the horizontal axis. Then operating point B shifts along the constant $T_{em}$ circle to operating point C, which brings the power factor even closer to unity.

Continuing the iterations of equation (9) ultimately establishes the unity power factor mode of operation corresponding to operating point D. The unity power factor operating point D is at the intersection of the constant $T_{em}$ circle, the final constant $I^r$ circle and the horizontal axis.

In actual practice the iterative process of shifting the initial operating point A to the ultimate unity power factor operating point D by the rotor current amplitude block 80 is more efficient than described here. This is due to the relatively low values of the stator resistance encountered in practical motors. For practical motors, point M is located on the positive horizontal axis, well to the right of the position shown in FIG. 8. This results because the distance $\overline{OM}$ is inversely proportional to the stator resistance as indicated by equation (9).

Hence, constant $T_{em}$ circles become close to straight vertical lines in the normal operating region. For a pure straight line in the ideal case, the unity power factor operating point D is identical to point $S^A$, which is the projection of the initial operating point A onto the horizontal axis. Therefore, the required rotor winding current $I^r$ is established immediately, without the succession of iterations described above.

The variable speed drive controller 30 may also control a synchronous motor to operate at substantially unity power factor while driving a varying mechanical load 14. However, the unity power factor current synthesizer 40' for a synchronous motor is somewhat simpler than that required for a doubly fed motor. Since a synchronous motor by definition has DC (direct current) current applied to the excitation windings which are conventionally on the rotor, the rotor current frequency block 70 is not required. Nor would there be any requirement for stabilizer 50 to produce a stabilizing damping frequency signal f'. Also, the signal generator 60 which introduces the 120° phase shifts to apply a three-phase signal to the energy converter 18 would not be required. However, the signal generator 60 may be replaced by a suitable signal conditioning means (not shown) for supplying the correct level of control signal to the energy converter 18". The energy converter 18" for a synchronous motor variable speed drive 16 would supply DC power to the rotor 25.

Additionally, the effectiveness of the rotor current amplitude block 80 in securing stable, unity power factor operation under changing load conditions is now considered using the example of the doubly fed motor 20. A change in the load condition involves three quantities: (1) the power demanded by the load 14, (2) the load torque, and (3) the rotor speed. The load power is equal to the product of load torque and rotor speed.

As previously discussed, the speed is completely within the control of the operator of the drive system by adjusting the reference signal $\omega_{m,\ REF}$ which is fed to the rotor current frequency block 70. Therefore, any change in the load condition at an operator prescribed speed is invariably associated with a change in the load torque.

Although torque limitations could be incorporated, the illustrated embodiment of the control system does not impose any restriction on the production of the electromagnetic torque $T_{em}$. Therefore, a change of the load torque within the design limits of the doubly fed machine 20 is compensated for by changing the torque $T_{em}$ produced by the doubly fed machine. However, the power (torque) angle $\delta$ must not exceed the critical value of 90°, where synchronism is lost. As discussed earlier, synchronism is maintained by the rotor current amplitude block 80, which maintains the power angle $\delta$ within the critical value. Hence, the rotor current amplitude block 80 provides the drive with a torque-speed characteristic which is compatible with any load condition.

To illustrate the operation of the unity power factor current synthesizer 40 under a varying load, assume that the initial unity power factor mode of operation corresponds to operating point D in FIG. 8. Now assume that the drive system 10 is subjected to a certain change of load torque, within design limits of the doubly fed machine 20. To compensate for this change, a corresponding change occurs in the electromagnetic torque produced by the motor 20. Without adjustment of the rms rotor 22 winding current $I^r$, a new operating point such as E is obtained, with a power factor deviating from unity. Operating point E is the intersection of the constant $I^r$ circle through the initial operating point D, and a new constant $T_{em2}$ circle due to the changed value of torque from $T_{em}$.

Iterations of the rotor current amplitude block 80 change the rotor winding current $I^r$ to a new constant $I_2^r$ circle. This shifts the operating point from E to the unity power factor mode of operation corresponding to operating point F which is the intersection of the horizontal axis with the $T_{em2}$ and $I_2^r$ circles. This process is performed in the same iterative manner by the rotor current amplitude block 80 as previously described for shifting operating point A into a unity power factor mode of operation corresponding to operating point D.

Since the relations shown in the rotor current amplitude block 80 of FIG. 2 are only algebraic in structure, the design is adequately implemented with microprocessors. Similarly, the use of analog components to accomplish the iterative process is straightforward. Hence, my invention can be implemented with either microprocessors or analog components by those skilled in the art.

The unity power factor current synthesizer 40 may also include calibrator means, such as a calibrator 90, for calibrating constants, specifically $c_1$, $c_2$ and $c_3$, using switch 100 as shown in FIG. 1 to establish the desired power factor. Alternatively, the unity power factor current synthesizer 40 may be comprised solely of the rotor current frequency and amplitude blocks, 70 and 80, with calibrator 90 as a separate unit. The constants $c_1$, $c_2$ and $c_3$ are needed to establish the rotor current amplitude signal $i^r$ output of block 80 which corresponds to the desired power factor.

For example, the procedure to determine these constants to establish a unity power factor is illustrated below. The expressions for determining these constants, given in equation (10), are in terms of the doubly fed motor 20 parameters: the stator resistance $R^s$, the stator self-inductance $L^{ss}$ (see equation (4)) and the stator to rotor mutual inductance $M^{sr}$. Rather than measuring these motor parameters, the desired constants $c_1$, $c_2$ and $c_3$ are calibrated.

To calibrate the constants $c_1$, $c_2$ and $c_3$, the switch 100 in FIG. 1 is changed from position L to position 0. Then $i^r$ is adjusted at no-load so $P^s = Q^s = 0$, where $Q^s$ is the reactive power at stator 22 (see FIG. 1). At this point, $c_1$ is determined:

$$c_1 = f_s I^r / V^s. \tag{11}$$

The motor 20 is then operated at an arbitrary load by setting $\omega_{m,\,REF}$ to any value and adjusting $I^r$ so $Q^s = 0$. To calculate constants $c_2$ and $c_3$, the following intermediate set of values is determined:

$$n_{A1} = (P^s / V^s)^2,$$
$$n_{A2} = P^s,$$
$$n_{A3} = (f_s I^r / c_1)^2 - (V^s)^2$$

An additional set of intermediate values $n_{B1}$, $n_{B2}$ and $n_{B3}$ is then determined using the equations (12) by setting $\omega_m$, REF to a different value. From these values, the constants $c_2$ and $c_3$ are determined:

$$c_2 = (n_{A1} n_{A3} - n_{A2} n_{B3}) / H$$
$$c_3 = (n_{B2} n_{B3} - n_{A3} n_{B1}) / H \tag{13}$$

with:

$$H = n_{A1} n_{B2} - n_{A2} n_{B1}.$$

In the ideal case, the mentioned motor parameters $R^s$, $L^{ss}$ and $M^{sr}$ depend only on the physical geometry and winding arrangements of the motor 20. Therefore, the calibration of $c_1$, $c_2$ and $c_3$ is only performed once for the entire life span of the variable speed drive system 10. However, certain factors, such as aging, saturation and hysteresis, affect the machine parameters, making recalibration and adjustment capability a desirable feature. The calibration feature allows the rotor current amplitude block 80 of FIG. 2 to provide results which secure unity power factor operation over the life span of the drive.

For the normal practical operating range of the motor 20, mere adjustment of the constants cannot provide near unity power factor operation. In certain applications, it is desirable to account for the nonlinear effects of saturation. This is easily implemented by the illustrated embodiment of this invention.

To account for saturation, the rms value of the magnetizing current $I_m$ is crucial. $I_m$ is equal to the rms value of the difference between the stator current phasor $I^s$ and rotor current phasor $I^r$, i.e., $I_m = |I^s - I^r|$. The magnetic material of the motor is saturated when $I_m$ exceeds a certain value, which causes a decrease in the values of stator and rotor winding inductances from the unsaturated condition values.

Figure 9:
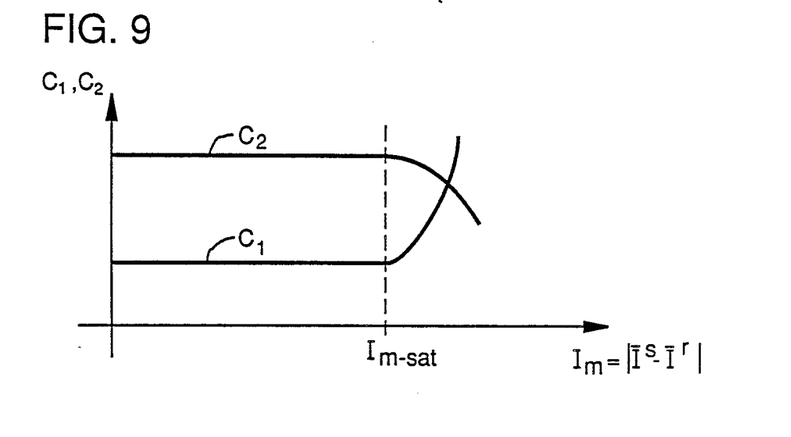
FIG. 9 is a graph illustrating the nonlinear effects of magnetic saturation on the performance of two quantities which are important to the process of establishing unity power operation.

Saturation causes an increase of $c_1$ and a decrease of $c_2$ from their unsaturated values, as can be seen from equation (10). This change in $c_1$ and $c_2$ due to the saturation is experimentally determinable and for a typical doubly fed machine 20 yields fixed curves similar to those shown in FIG. 9. The values of $c_1$ and $c_2$ are constant until the magnetizing current $I_m$ exceeds a certain value, $I_{m-sat}$, which is dependent upon the type of magnetic material used. The behavior of $c_1$ and $c_2$ subject to $I_m$ may be included in the rotor current amplitude block 80 of FIG. 1. Simple analog function generators or microprocessor based storage devices known to those skilled in the art are capable of storing the curves of FIG. 9. Integration of this feature into the rotor current amplitude block 80 requires the additional sensing and input of the current $I_m$.

Thus, this invention provides an AC variable speed drive utilizing a doubly fed motor with the capability to control the rotor speed according to a control strategy which controls the power factor operation of the motor, irrespective of varying mechanical load conditions. Preferably, the control strategy secures near unity power factor operation under the varying load conditions. This characteristic of the variable speed drive is provided in a way which facilitates reliable operation and effective coordination of the power conditioning tasks of the doubly fed machine.

The associated method of controlling a doubly fed motor 20 driving a varying mechanical load 14 so as to control the power factor operation of the doubly fed motor comprises several steps. This process includes the step of monitoring the input values of the electrical power grid system 12 to the motor 20. In a synthesizing or processing step, these input values are synthesized with a precalibrated constant to produce a maximum amplitude signal. The synthesizing step is repeated or iterated to produce a maximum amplitude signal for a given torque output at unity power factor. In an establishing step, a frequency signal from the electric power grid system frequency is established along with a reference angular rotor speed. The actual angular rotor speed of the doubly fed motor is sensed in a sensing step for use in stabilizing the damping to the doubly fed motor. A stabilizing step produces a stabilizing damping frequency signal from the actual angular rotor speed. This stabilizing damping frequency signal is combined with the established frequency signal to produce an output frequency signal in a combining step. A three-phase controller signal is generated in a generating step from this output frequency signal and the synthesized maximum amplitude signal. A three-phase doubly fed motor input signal is produced in a converting step from the input power from the electric power grid according to the three-phase controller signal. Under this control process the doubly fed motor maintains unity power factor operation under varying mechanical loads. An additional method is also provided for controlling an AC variable speed drive having a doubly fed motor and an energy converter.

A method for controlling a synchronous motor under varying mechanical loads while maintaining unity power factor is similar to the method for controlling the doubly fed motor. However, the synchronous motor control method is accomplished without the establishing, sensing, stabilizing and combining steps required in the doubly fed motor control process. Additionally, the generated control signal and the converting step supply DC excitation to the synchronous motor field windings instead of polyphase excitation as required by the doubly fed motor.

Additional steps are also included, such as intermittently calibrating the precalibrated constant of the synthesizing step to account for aging and hysteresis effects on the motor. Compensating for saturation includes the steps of calculating values of the stator and rotor currents of the motor from the monitored input voltage and active power and from the precalibrated constant. The magnetizing current of the motor is determined as the difference between the calculated values of stator and rotor currents in a determining step. From this, in an adjusting step, the precalibrated constant is adjusted when the determined magnetizing current exceeds a predetermined saturation value. Additional steps are provided for limiting a power angle to values less than 90°. Also, there is a step provided for avoiding sudden stepwise changes of the reference angular rotor speed by an operator, which aids in maintaining steady state stability of the variable speed drive system.

Having illustrated and described the principles of my invention with respect to the preferred embodiments, it should be apparent to those skilled in the art that my invention may be modified in arrangement and detail without departing from such principles. For example, the VSD system 10 may also be operated to control the power factor of the motor 19 or 20 at values other than unity, if desired by the particular application. I claim all modifications falling within the scope and spirit of the following claims.

I claim:

1. A method for controlling a doubly fed motor driving a load, the doubly fed motor having stator windings and rotor windings and receiving power from an electric power grid having a system frequency, the method comprising the steps of:
   monitoring the values of the electric power grid input to the doubly fed motor;
   setting a reference angular rotor speed;
   synthesizing the monitored values of the electric power grid input and the set reference angular rotor speed to produce a polyphase controller signal; and
   converting input power from the electric power grid, according to the polyphase controller signal, to produce a polyphase doubly fed motor input for supply to the doubly fed motor so as to control the power factor of the doubly fed motor, irrespective of variations in the load.

2. A method of controlling a doubly fed motor according to claim 1 wherein the synthesizing step comprises:
   synthesizing the monitored inputs of the electric power grid with a precalibrated constant to produce an initial maximum amplitude signal; and
   adjusting the initial maximum amplitude signal to a final maximum amplitude signal in a step-wise fashion by iterating a step of synthesizing the monitored inputs of the electric power grid with a precalibrated constant to ultimately produce the final maximum amplitude signal for a given load torque at a desired power factor.

3. A method for controlling a doubly fed motor according to claim 2 wherein the step of adjusting an initial maximum amplitude signal comprises the step of adjusting an initial maximum rotor current amplitude.

4. A method for controlling a doubly fed motor according to claim 2 wherein the synthesizing step further includes establishing a frequency signal from the electric power grid system frequency and the set reference angular rotor speed.

5. A method for controlling a doubly fed motor according to claim 4 wherein establishing the frequency signal comprises establishing the rotor current frequency.

6. A method for controlling a doubly fed motor according to claim 4 wherein the monitoring step further comprises monitoring the actual angular rotor speed of the doubly fed motor.

7. A method for controlling a doubly fed motor according to claim 6 wherein the synthesizing step includes:
   stabilizing the damping to the doubly fed motor by using the monitored actual angular rotor speed to produce a stabilizing damping frequency signal; and
   combining the stabilizing damping frequency signal with the established frequency signal to produce an output frequency signal.

8. A method for controlling a doubly fed motor according to claim 7 wherein the step of adjusting an initial maximum amplitude signal comprises the step of adjusting an initial maximum rotor voltage amplitude.

9. A method for controlling a doubly fed motor according to claim 7 wherein establishing the frequency signal comprises establishing the rotor voltage frequency.

10. A method for controlling a doubly fed motor according to claim 7 wherein the synthesizing step includes generating the polyphase controller signal from the iterated synthesized maximum amplitude signal and the output frequency signal.

11. A method for controlling a doubly fed motor according to claim 10 wherein monitoring the input values of the electric power grid to the doubly fed motor comprises monitoring the voltage and active power.

12. A method for controlling a doubly fed motor according to claim 2 further including the step of intermittently calibrating the precalibrated constant of the synthesizing step.

13. A method for controlling a doubly fed motor according to claim 11 further comprising the steps of:
   calculating values of the stator and rotor currents of the doubly fed motor from the monitored input voltage and active power, and from the precalibrated constant,
   determining a magnetizing current of the doubly fed motor, from the difference between calculated values of the stator and rotor currents; and
   adjusting the precalibrated constant when the determined magnetizing current exceeds a predetermined saturation value.

14. A method for controlling a doubly fed motor according to claim 10 further comprising the step of limiting a power angle to values less than 90°, which maintains stable steady-state operation of the doubly fed motor.

15. A method for controlling a doubly fed motor according to claim 1 wherein the setting step comprises avoiding sudden stepwise changes of the reference angular rotor speed by an operator to maintain steady-state stability of the doubly fed motor.

16. An AC drive system which receives electrical power from an electrical power grid at a system frequency, and which delivers mechanical power to a rotating mechanical load, operating substantially at a desired power factor as seen from the electric power grid, the system comprising:
- an AC motor having a stator, a rotor, polyphase power windings wound on one of the stator or rotor, and excitation windings wound on the other of the stator or rotor, and which receives electrical power from the electrical power grid and delivers rotating mechanical power to the load;
- energy conversion means responsive to a controller signal for converting electrical power from the electrical power grid into excitation power which is applied to the excitation windings of the motor;
- input sensing means for sensing input values of the electrical power grid to the AC motor; and
- drive controller means for controlling the energy conversion means by producing the control signal from at least one signal processing means including amplitude signal processing means for producing a maximum amplitude signal from the sensed input values of the electrical power grid.

17. An AC drive system according to claim 16 wherein the amplitude signal processing means further includes calibrator means for periodic use for calibrating the amplitude signal processing means to account for aging of the motor.

18. An AC variable speed drive system according to claim 16 wherein the AC motor is a synchronous motor having excitation windings on the rotor, and wherein the excitation power is DC power.

19. An AC drive system according to claim 16 wherein the AC motor is a variable speed doubly fed motor having the excitation windings on the rotor, and power windings on the stator receiving power from the electric power grid, and wherein the excitation power is polyphase.

20. An AC drive system according to claim 19 wherein the drive controller means further includes:
- adjustable means for setting a desired reference motor speed;
- frequency signal processing means for producing a reference frequency signal from the adjusted desired reference motor speed; and
- signal generator means for generating the controller signal to control the energy conversion means from the maximum amplitude signal and the reference frequency signal.

21. An AC drive system according to claim 20 wherein the energy conversion means comprises power electronic converter.

22. An AC drive system according to claim 21 wherein the maximum amplitude signal comprises the maximum rotor current amplitude, wherein the reference frequency signal comprises the rotor current frequency, and wherein the power electronic converter is operated in a controllable current source mode.

23. An AC drive system according to claim 20 further including:
- speed sensing means for sensing the actual output speed of the motor driving the load;
- stabilizing means for producing a damping frequency signal from the sensed actual motor output speed; and
- wherein the signal generator means generates the controller signal from the damping frequency signal, the maximum amplitude signal and the reference frequency signal.

24. An AC drive system according to claim 23 wherein the maximum amplitude signal comprises the maximum rotor voltage amplitude, and wherein the reference frequency signal comprises the rotor voltage frequency.

25. A method for controlling a synchronous motor under mechanical loads, irrespective of any varying torque or speed requirements of such a load, while maintaining a desired power factor operation, the synchronous motor having DC excitation field windings and receiving power from an electric power grid, the method comprising the steps of:
- monitoring the values of the electric power grid input to the synchronous motor;
- synthesizing the monitored inputs of the electric power grid with a precalibrated constant to produce an initial maximum amplitude signal;
- generating a controller signal from the synthesized initial maximum amplitude signal; and
- converting input power from the electric power grid, according to the controller signal, to produce a DC excitation input for supply to the field windings of the synchronous motor so as to control the power factor of the synchronous motor, irrespective of variation in the load.

26. A method for controlling a synchronous motor according to claim 25 further including the step of:
- adjusting a maximum amplitude signal from the initial maximum amplitude signal to a final maximum amplitude signal in a step-wise fashion by iterating the synthesizing step of synthesizing the monitored inputs of the electric grid with a precalibrated constant to ultimately produce the final maximum amplitude signal for a given load torque at the desired power factor; and
- wherein the generating step comprises generating step-wise changes in the controller signal corresponding to the step-wise changes in the maximum amplitude signal during the adjusting step.

27. A method of providing variable speed control to a variable speed drive having an energy converter supplying a doubly fed motor which has stator windings and rotor windings and which receives power from an electrical power grid having a system frequency, the method comprising the steps of:
- establishing a frequency signal from a reference angular rotor speed and the system frequency;
- synthesizing the input values of the electric power grid received by the doubly fed motor with a precalibrated constant to produce a maximum amplitude signal;
- iterating the synthesizing step to produce the maximum amplitude signal corresponding to a desired power factor operation of the doubly fed motor; and
- generating a polyphase controller output signal from the maximum amplitude signal and the established frequency signal for input to the energy converter of the variable speed drive, so as to control the power factor of the doubly fed motor of the variable speed drive, irrespective of variations in a load driven by the motor.

28. A method for providing variable speed control according to claim 27 wherein synthesizing input values of the electric power grid comprises synthesizing the voltage and active power, and wherein generating the controller output signal comprises supplying positive and negative 120 phase shifts to the maximum current amplitude signal and the established current frequency signal, generating a balanced polyphase signal which represents the polyphase rotor current of a polyphase doubly fed motor.

29. A method for providing variable speed control according to claim 27 further comprising the steps of:
limiting a power angle of the doubly fed motor to values less than 90°; and
avoiding sudden stepwise changes of the reference angular rotor speed by an operator, whereby a stable steady-state operation of the doubly fed motor is maintained.

30. A method for providing variable speed control according to claim 27 further comprising the steps of:
intermittently calibrating the precalibrated constant of the synthesizing step, to correct for aging and hysteresis effects on the performance of the doubly fed motor;
continually determining a magnetizing current from the precalibrated constant and the input values of the electric power grid; and
adjusting the precalibrated constant when the determined magnetizing current exceeds a predetermined saturation value.

31. A method for providing variable speed control according to claim 27 further including the step of stabilizing the established frequency signal with an actual angular rotor speed signal to produce a stabilizing damping frequency signal; and
wherein the generating step further comprises generating the polyphase controller output signal from the stabilizing damping frequency signal.

32. A method for providing variable speed control according to claim 31 wherein generating the controller output signal comprises supplying positive and negative 120° phase shifts to the maximum voltage amplitude signal and the stabilizing damping voltage frequency signal, generating a signal which represents the polyphase rotor voltage of the doubly fed motor.

33. A variable speed drive controller for controlling a variable speed drive having an energy converter supplying a doubly fed motor which has rotor windings and stator windings, and which receives power from an electric power grid having a system frequency, the controller comprising:
means for synthesizing the input values of the electric power received by the doubly fed motor from the electric power grid with a precalibrated constant to produce a maximum amplitude signal corresponding to operation of the doubly fed motor at a desired power factor;
means for establishing a frequency signal from a reference angular rotor speed and the system frequency; and
means for generating a polyphase controller output signal from the maximum amplitude signal and the established frequency signal for input to the energy converter of the variable speed drive which supplies the doubly fed motor.

34. A variable speed drive controller according to claim 33 for a drive having a doubly fed motor with rotor windings supplied by the energy converter, wherein the means for generating the controller output signal comprises means for supplying positive and negative 120° phase shifts to the maximum current amplitude signal and to the established current frequency signal, generating a balanced three controller output signal.

35. A variable speed drive controller according to claim 33 wherein the input values synthesized by the synthesizing means are the voltage and active power of the electric power received by the stator windings of the doubly fed motor from the electric power grid.

36. A variable speed drive controller according to claim 33 further comprising means for limiting a power angle, dependent upon operating parameters of the doubly fed motor at an operating point, to values less than 90°, which maintains a stable steady-state operation of the doubly fed motor.

37. A variable speed drive controller according to claim 33 further comprising means for avoiding sudden stepwise changes of the reference angular rotor speed of the doubly fed motor by an operator, which maintains steady-state stability of the doubly fed motor.

38. A variable speed drive controller according to claim 33 further comprising:
means for intermittently calibrating the precalibrated constant of the synthesizing step, to correct for aging and hysteresis effects on the performance of the doubly fed motor.,
means for continually determining a magnetizing current from the precalibrated constant and the input values of the electric power grid; and
means for adjusting the precalibrated constant when the determined magnetizing current exceeds a predetermined saturation value.

39. A variable speed drive controller according to claim 33 further including:
means for stabilizing the established frequency signal with an actual angular rotor speed signal detected by a speed sensor, to produce a stabilizing damping frequency signal; and
wherein the means for generating generates the controller output signal from the maximum voltage amplitude signal and the stabilizing damping voltage frequency signal.

40. A variable speed drive controller according to claim 39 wherein the generating means for generating the controller output signal further includes means for supplying positive and negative 120° phase shifts to the maximum voltage amplitude signal and the stabilizing damping voltage frequency signal generating a controller output signal which represents the balanced polyphase voltage of the excitation windings of a polyphase doubly fed motor.

41. A drive controller for controlling a synchronous speed drive having an energy converter supplying a synchronous motor which has a rotor and which receives power from an electric power grid having a system frequency, the controller comprising:
means for synthesizing the input values of the electric power grid received by the synchronous motor with a precalibrated constant to produce a maximum amplitude signal corresponding to a desired power factor operation of the synchronous motor;
means for limiting a power angle, dependent upon operating parameters of the synchronous motor at an operating point, to values less than 90°;
means for intermittently calibrating the precalibrated constant of the synthesizing step, to correct for aging and hysteresis effects on the performance of the synchronous motor;

means for continually determining a magnetizing current from the precalibrated constant and the input values of the electric power grid; and
means for adjusting the precalibrated constant when the determined magnetizing current exceeds a predetermined saturation value.

42. A power factor synthesizer, for use in a variable speed drive control of a doubly fed motor having excitation windings and receiving power from an electrical power grid having a system frequency, the synthesizer comprising:
means for establishing a frequency signal from an input reference angular rotor speed and the system frequency;
means for synthesizing the input values of the electric power grid received by the doubly fed motor with a precalibrated constant to produce a maximum amplitude signal for operation of the doubly fed motor at a desired power factor;
means for intermittently calibrating the precalibrated constant to correct for aging and hysteresis effects on the performance of the doubly fed motor;
means for continually determining a magnetizing current from the precalibrated constant and the input values of the electric power grid;
means for comparing the determined magnetizing current with a predetermined saturation value; and
means for adjusting the precalibrated constant when the magnetizing current exceeds the saturation value.

43. The power factor synthesizer according to claim 42 wherein the input values synthesized by the synthesizing means are the voltage and active power of the electric power grid, and the frequency signal and maximum amplitude signal outputs represent the current to be supplied to the excitation windings of the doubly fed motor.

44. A power factor synthesizer for controlling a synchronous speed drive comprising an energy converter and a synchronous motor having excitation windings responsive to the energy converter, the synchronous motor receiving power from an electrical power grid having a system frequency, the synthesizer comprising:
means for synthesizing the input values of the electric power grid received by the synchronous motor with a precalibrated constant to produce a maximum amplitude signal for input to the energy converter;
means for intermittently calibrating the precalibrated constant to correct for aging and hysteresis effects on the performance of the synchronous motor;
means for continually determining a magnetizing current from the precalibrated constant and the input values of the electric power grid;
means for comparing the determined magnetizing current with a predetermined saturation value; and
means for adjusting the precalibrated constant when the magnetizing current exceeds the saturation value.

* * * * *